United States Patent [19]

Duschl

[11] Patent Number: 4,602,272
[45] Date of Patent: Jul. 22, 1986

[54] ELECTRON BEAM INTENSITY PROFILE MEASURING SYSTEM AND METHOD

[75] Inventor: Robert A. Duschl, Lancaster, Pa.

[73] Assignee: RCA Corporation, Princeton, N.J.

[21] Appl. No.: 670,605

[22] Filed: Nov. 13, 1984

[51] Int. Cl.[4] ............................................. H04N 17/02
[52] U.S. Cl. ..................................... 358/10; 324/404; 315/10; 356/121
[58] Field of Search ............................ 358/10, 139, 69; 324/404; 315/10, 368; 356/121; 364/560, 563

[56] References Cited

U.S. PATENT DOCUMENTS

| | | | |
|---|---|---|---|
| 4,001,877 | 1/1977 | Simpson | 358/10 |
| 4,316,211 | 2/1982 | Mackey et al. | 358/10 |
| 4,336,597 | 6/1982 | Okubo et al. | 364/560 |
| 4,364,079 | 12/1982 | Pons | 358/10 |
| 4,387,394 | 6/1983 | Powell | 358/139 |
| 4,408,163 | 10/1983 | Burr et al. | 324/404 |
| 4,439,735 | 3/1984 | Alvite et al. | 324/404 |
| 4,441,120 | 4/1984 | Gerritsen | 358/10 |

FOREIGN PATENT DOCUMENTS 0130836 10/1979 Japan ..................................... 358/10

Primary Examiner—James J. Groody
Assistant Examiner—Michael P. Dunnam
Attorney, Agent, or Firm—E. M. Whitacre; D. H. Irlbeck; L. L. Hallacher

[57] ABSTRACT

A system for measuring the intensity profiles of the electron beams of color kinescopes includes a camera having a CCD. A color field is placed on the kinescope screen and a pixel in the center of one of the colored stripes is selected. The color field is turned off and the beam is scanned in short lines in one direction and incrementally stepped across the selected pixel in the perpendicular direction. The charge level on the selected pixel is representative of the beam intensity and is recorded. The entire beam is stepped across the pixel to measure the intensity profile in one direction. The directions of scanning and stepping are then interchanged to measure the beam intensity profile in the normal direction. The process is then repeated for the other electron beams in the kinescope.

5 Claims, 5 Drawing Figures

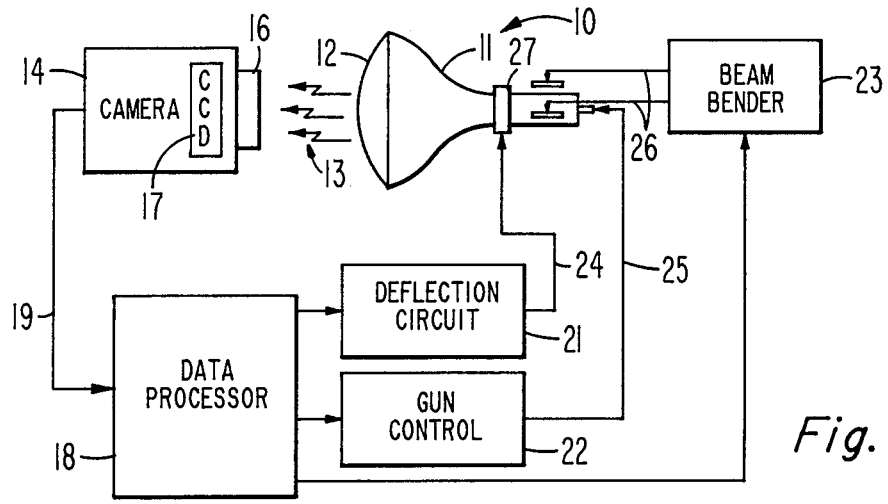
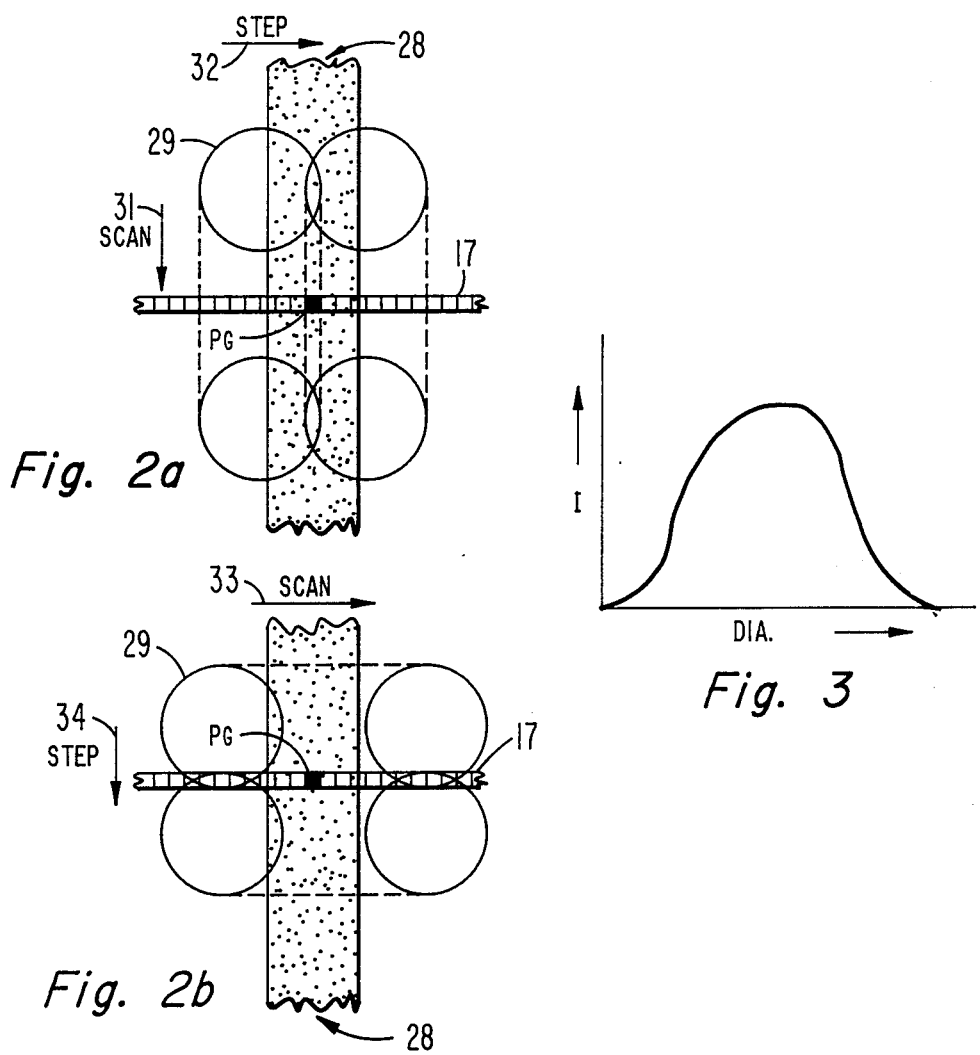
Fig. 1
Fig. 2a
Fig. 2b
Fig. 3

ELECTRON BEAM INTENSITY PROFILE MEASURING SYSTEM AND METHOD

BACKGROUND

This invention relates generally to the production of kinescopes for color television receivers and particularly to a system and method for measuring the intensity profile of the electron beams of such kinescopes.

The screens of many kinescopes are composed of phosphor stripes each of which emits a different color of light when impacted by electrons. Each kinescope includes an electron gun which provides, electron beams for individually scanning each of the color light emitting phosphors. The electron beams are scanned across the screen in a raster fashion so that each of the electron beams impacts the phosphor which emits the desired light color. The electron beams are individually modulated so that the primary light colors are combined to produce the desired color at each spot on the screen. Because each electron beam must be individually modulated in accordance with the intensity of the beam, it is necessary to measure the intensity profile of the electron beams to permit optimization of the electron beam modulation and other characteristics of the beam.

A current method commonly used in measuring the electron beam profile utilizes a narrow, light transparent slit in an opaque member. The narrow slit is aligned with a photomultiplier tube which measures the light transmission through the slit. The slit is carefully centered over the appropriate color phosphor and the electron beam to be measured slowly scans a raster line across the slit. As the raster line passes the slit, the output voltage of the photomultiplier tube is proportional to the intensity profile of the electron beam. Thus, the intensity profile along one axis, for example, the horizontal axis of the beam is indicated by the change in output of the photomultiplier tube. The slit is then repositioned over a different color producing phosphor line and the process repeated until all the electron beams are measured. The slit is then rotated 90° and the raster lines are swept in a direction 90° to that of the original sweeping and the process repeated to obtain the electron beam intensity profile in the perpendicular, for example vertical, direction.

The above method of measuring the electron beam intensity profile suffers several significant disadvantages. Substantial time and labor are spent mechanically positioning the slit over the phosphor stripes of the various colors. Thus, the measurement of the profiles of all three beams along both the horizontal and vertical axes at one position on the screen necessitates the mechanical positioning of the slit six different times. Typically measurements are taken at various locations on the screen and accordingly the measurements at each location requires the positioning of the slit six times. For this reason, substantially more time is spent in positioning the slit with respect to the phosphor stripes than is spent in actually taking the beam profile measurements. Additionally, because the slit is mechanically positioned with respect to the phosphor stripes, the accuracy of the measurements is dependent upon the positioning of the slit. For these reasons, there is a need for a system and method of electron beam intensity profile measurement which is more accurate and subtantially less time consuming. The present invention fulfills these long felt needs.

SUMMARY

A system for measuring the intensity profiles of the electron beams in a CRT having a screen composed of triads of phosphors which produce different colors of light when impacted by the electron beams includes a CCD camera. The camera images a color field which is scanned on the screen by one beam while the other color beams of the CRT are off. The center of one of the triads is identified and a CCD pixel in the proximity of the center of the triad is selected. Means is provided for turning off the color field. Deflection means deflects the electron beam whereby the beam impacts the screen in the proximity of the selected pixel. Beam bender means incrementally steps the electron beam across the pixel in one direction and subsequently in another direction normal to the one direction while the deflection means scans the beam in short lines in a direction substantially normal to the direction of incremental stepping whereby the beam is incrementally stepped across the pixel in the one direction and then the other direction. The intensity representative signal on the pixel for each of the incremental steps is stored whereby the intensity profiles of the electron beams in both of the scanning directions are measured.

BRIEF DESCRIPTION OF THE DRAWINGS

FIG. 1 is a block diagram of an electron beam intensity profile measuring system utilizing the present invention.

FIGS. 2a and 2b show how the selected CCD pixel is positioned with respect to a phosphor stripe and how the electron beam is scanned and stepped across the selected pixel.

FIG. 3 shows how the light intensity of electron beam varies across the diameter of the beam.

DETAILED DESCRIPTION

Figure 4:
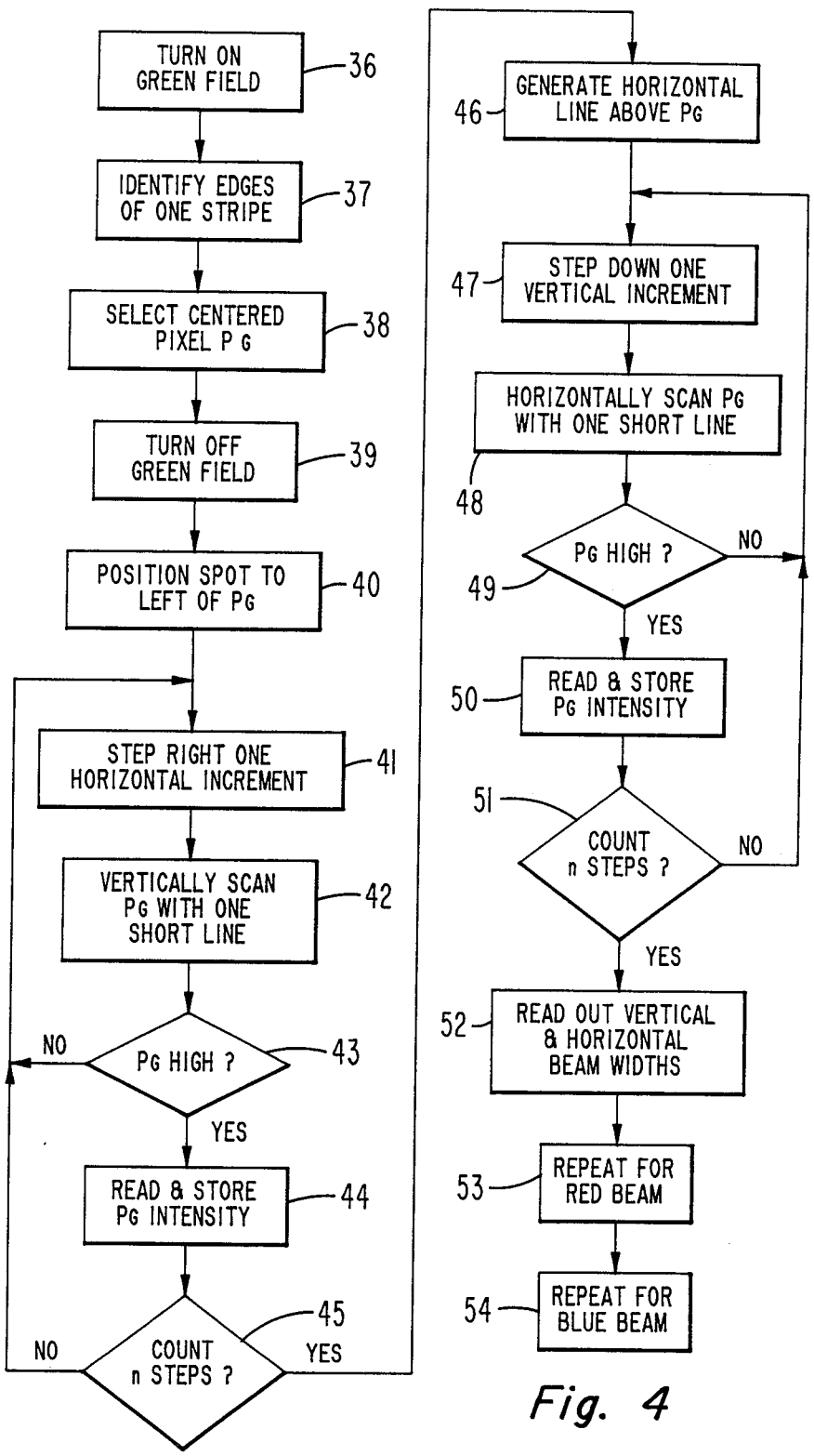
FIG. 4 is a flow chart of a preferred embodiment of the present invention.

FIG. 1 shows an electron beam intensity profile measuring system 10 coupled to a kinescope 11 having a screen 12. The light output of the kinescope 11, represented by the arrows 13, is directed to a camera 14. The camera 14 includes a lens 16 which is a standard optical light focussing lens and a CCD 17 (charge coupled device). The CCD 17 can be a linear array of pixels oriented substantially perpendicular to the phosphor stripes of which the screen 12 is composed. Alternatively, the CCD 17 can be a planar array of pixels with the pixels being arranged in rows and columns. When a planar CCD array is utilized, a row or column which extends substantially normal to the phosphor lines of the screen 12 is selected for processing and the other pixels are ignored.

The output of the camera 14 is provided to a data processor 18 over a line 19. The transfer of data from the pixels of the CCD 17 to the data processor 18 is well known to those skilled in the art. The data processor 18 controls a deflection circuit 21, a gun control 22 and a beam bender 23 which are coupled to the kinescope 11 by output lines 24, 25 and 26, respectively. The deflection circuit 21, the gun control 22 and the beam bender 23 are well known commercially available components. The deflection circuit 21 is coupled to the yoke 27 of the kinescope 11 and is used to scan the electron beams horizontally and vertically across the screen 12. The deflection circuit 21 therefore also is used to scan the electron beams in the short horizontal and vertical lines needed to utilize the present invention as explained more fully hereinafter. The gun control 22 is used to turn the red, green and blue electron guns within the kinescope 11 on and off at the appropriate times. The beam bender 23 is used to step the short vertical and horizontal scan lines in the appropriate direction during the measurement of the electron beam intensity profile in a manner described hereinafter.

In FIG. 2a the CCD 17 is substantially perpendicular to a phosphor stripe 28. The CCD 17 can be a linear array very similar to that illustrated or it can be a particular row or column of a planar CCD array. In either event, a pixel PG which lies at the close proximity to the center of the phosphor line 28 is selected as the pixel used to measure the electron beam profile. The electron beam 29 initially is positioned above and to the left of the selected pixel PG. The beam 29 is shown as being substantially circular in cross section, typically the configuration is elliptical. The electron beam 29 is vertically scanned in short scan lines by the deflection circuit 21 (FIG. 1) as indicated by the scan arrow 31. At the same time, the electron beam 29 is incrementally stepped to the right, as indicated by the arrow 32, by the beam bender 23. As the beam 29 passes over the center pixel PG the charge level on the pixel PG changes in accordance with the intensity of the electron beam in the manner shown in FIG. 3. Thus, as shown in FIG. 3 when the center of the electron beam passes over the pixel PG, the maximum intensity is realized and the minimum intensity is realized when the edges of the electron beam pass over the pixel PG. Accordingly the beam intensity profile is measured by reading and storing the intensity proportional charge level on the pixel PG for the scan lines across the pixel. After the entire beam has passed over the pixel PG, the electron beam 29 is repositioned above and to the left of the pixel PG and the scanning and stepping directions reversed, as indicated by the scan arrow 33 and step arrow 34 in FIG. 2b. Thus, in FIG. 2b the deflection circuit 21 (FIG. 1) scans the electron beam in short horizontal lines, e.g. perpendicular to the phosphor line 28 while the beam bender 23 incrementally steps the electron beam vertically across the center pixel PG. After the entire electron beam 29 has passed over the pixel PG, the intensity profile of the beam in both the horizontal and vertical directions has been measured without any mechanical movement of any of the measuring elements. Additionally, after the first electron beam, for example the green beam, is measured a pixel centered on a blue phosphor stripe can be selected and the process repeated for the blue beam. A pixel for the red electron beam can then be selected and the process repeated. Thus the profiles of all beams can be measured in both directions without mechanically manipulating any of the components of the system.

The pixel PG is selected by first scanning one electron beam, for example the green beam, to produce a green field across the entire screen 12 of the kinescope 11. All pixels of the CCD 17 which receive energy from the green phosphors thus are illuminated and charged to a higher level. Accordingly it is a simple matter to identify the edges of the green phosphor stripes and to select a pixel which is centered with respect to one of the green phosphor stripes. The green field is then turned off and the short vertical and horizontal lines scanned by the green beam while the charge level on the selected central pixel is recorded as indicative of the beam intensity for the short lines. After the measurement of the green electron beam is completed, the green and red guns are turned off and the blue beam is utilized to select a pixel centered on a blue stripe and the measurement process repeated. It should be noted that because many pixels are illuminated by light from each of the colored phosphors a plurality of measurements for each electron beam can be made across the face of the screen 12 simply by positioning the electron beam 29 in the desired positions with respect to the selected pixels. Thus plural measurements can be made without moving the CCD or any other element of the system 10.

In the preferred embodiment of FIG. 4, the measurement begins by turning on the green field at step 36. In this state, the deflection circuit 21 of FIG. 1 scans the green electron beam across the entire screen 12 to produce a green field while the red and blue electron guns are turned off. Obviously if desired, the red or blue electron beam can be the first to be measured. At step 37, the edges of one of the green colored light emitting phosphor stripes is identified and at step 38 a pixel PG which is very nearly centered within the phosphor stripe is selected. At step 39 the green field is turned off. At step 40 the green electron beam is positioned to the left and above the selected pixel PG as shown in FIG. 2a. The electron beam is stepped right one horizontal increment at step 41 and at step 42 the beam is vertically scanned one short vertical line, as indicated by the vertical scan arrow 31 in FIG. 2a. At step 43, the charge level on the pixel PG is investigated to determine whether or not the beam passed over the pixel PG. When the pixel PG is not high the beam did not pass over the pixel PG and step 41 is reentered and the beam is horizontally stepped another increment to the right and vertically scanned another short line. At step 43 when pixel PG is high, the beam has passed over the pixel and the charge level on the pixel is directly proportional to the intensity of the electron beam. The reading is read and stored as one of the horizontal intensity profile measurements at step 44. At step 45 when a sufficient number of horizontal steps has not been completed to insure that the entire horizontal dimension of the beam 29 has crossed the pixel PG, step 41 is reentered and another horizontal incremental step taken to repeat the vertical scanning and beam intensity measurement as the beam again crosses the pixel PG. The number of incremental steps required is dependent upon the type and size of the kinescope being measured and accordingly can be manually input when the kinescope is placed into the system 10. However, the rapidity and ease of taking the measurement permits a large number of incremental steps to be selected to insure that the entire beam 29 crosses the pixel PG. When the selected number of horizontal incremental steps has been completed, the electron beam 29 is repositioned above and to the left of the selected pixel PG at step 46. At step 47 the beam is incrementally stepped vertically as indicated by the arrow 34 in FIG. 2b and the beam is scanned horizontally across the pixel, as indicated by the arrow 33 of FIG. 2b at step 48. At step 49 when the pixel PG is not high, the beam failed to pass over the pixel PG and step 47 is reentered to repeat the vertical incrementation of the beam and to horizontally scan another short line across the pixel. At step 49 when pixel PG is high, the intensity indicative charge level of the pixel PG is read and stored at step 50. At step 51 when the number of vertical steps needed to scan the full vertical dimension of the beam across the pixel has not been completed, step 47 is reentered and the vertical incremental stepping and horizontal scanning are repeated and the intensity is again measured. At step 51 after the required number of vertical steps is completed, the horizontal and vertical beam widths are read out at step 52 and the intensity profile of the green beam is known. The measurement process is then repeated for the red and blue electron beams as indicated by steps 53 and 54.

What is claimed is:

1. A system for measuring the intensity profiles of the electron beams in a CRT having a screen composed of triads of phosphors for producing different colors of light when impacted by said electron beams, said system comprising:

camera means including a charge coupled device (CCD) for imaging a color field on said screen while the other colors of said CRT are turned off;

means for identifying the center of one of said triads;

means for selecting a CCD pixel in the proximity of the center of said triad;

means for turning off said color field;

deflection means for deflecting said electron beam whereby said beam impacts said screen in the proximity of said selected pixel;

beam bender means for incrementally stepping said electron beam across said pixel in one direction and subsequently in another direction normal to said one direction while said deflection means scans said beam in short lines in a direction substantially normal to the direction of said incremental stepping whereby said beam is incrementally stepped across said pixel in said one direction and said another direction; and means for storing the intensity representative signal on said pixel for each of said incremental steps whereby the intensity profiles of said electron beams in said one direction and said another direction are measured.

2. The system of claim 1 further including means for selecting the number of said incremental steps.

3. A method of measuring the intensity profile of the electron beams in a CRT having a screen composed of triads of phosphors for producing different color of light when impacted by said electron beams comprising the steps of:

imaging one color field from said scan onto a camera having a charge coupled device (CCD) whereby the pixels of said CCD are charged to levels representative of the electron beam intensity;

identifying the edges of one of said triads and selecting a CCD pixel in the proximity of the center of said triad;

turning off said color field;

positioning the electron beam for producing said color field in the proximity of said selected pixel;

scanning said electron beam in a scan direction while incrementally stepping said beam across said pixel in a stepping direction substantially normal to said scan direction;

recording the beam intensity related charge level on said CCD whereby the intensity profile of said beam in said stepping direction is measured; and interchanging said scan direction and said stepping direction whereby the beam intensity profile in said scan direction is measured 4. The method of claim 3 further including the step of selecting the number of said incremental steps.

5. The method of claim 3 wherein said steps are repeated for the other two color fields of said CRT whereby the intensity profiles of the three beams within said CRT are measured.

* * * * *